May 18, 1926.
J. L. ENSOR
GYMNASIUM EQUIPMENT
Filed July 7, 1923
1,585,334
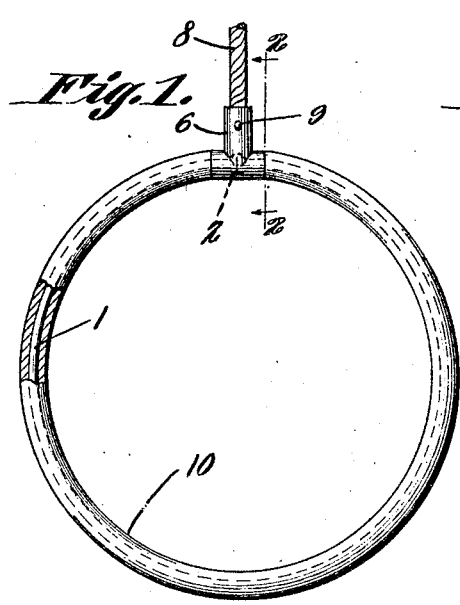
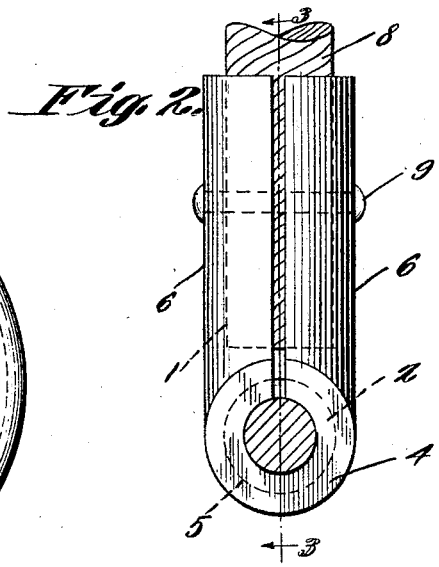
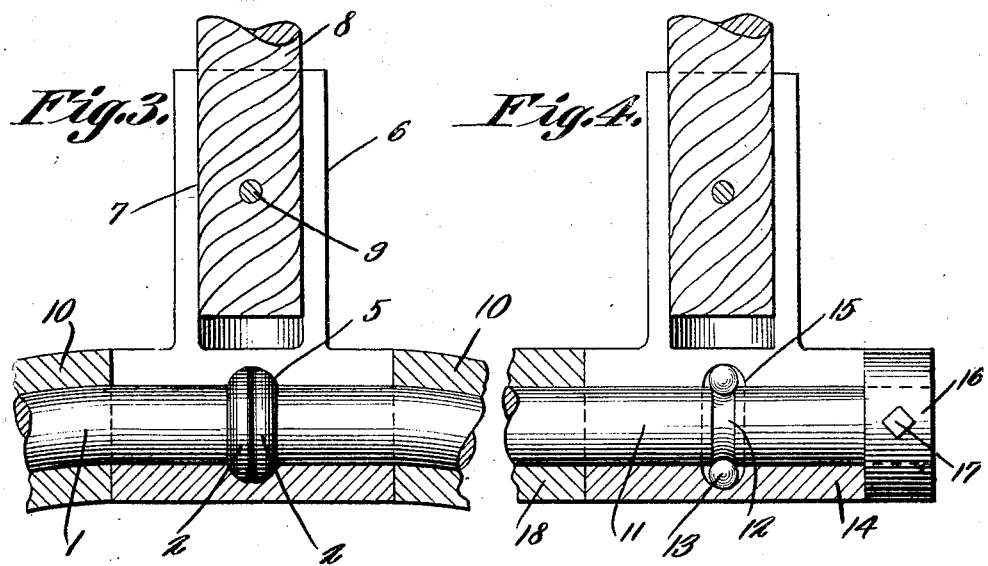
J. L. Ensor, Inventor.
By C. A. Snow & Co.
Attorneys Patented May 18, 1926.

1,585,334

UNITED STATES PATENT OFFICE.

JAMES L. ENSOR, OF COOKEVILLE, TENNESSEE.

GYMNASIUM EQUIPMENT.

Application filed July 7, 1923. Serial No. 650,038.

This invention relates to certain types of equipment for use in gymnasiums and by gymnasts generally and is primarily designed as an improvement upon the construction of trapezes, flying rings and the like. Structures of this character as heretofore made are formed with hard grip portions which produce rough and calloused skin upon the hands and are more difficult to grasp and hold than would be a soft substance. Furthermore the connections between the bars and rings and their flexible supports have been faulty and often become separated.

One of the objects of the present invention is to provide trapeze bars and flying rings with sleeves of soft rubber so that they can be grasped firmly, will not harden the hands, and materially reduce the danger of slipping.

A further object is to provide a connection between a trapeze bar or a ring and its support which will constitute a positive grip for the parts engaged thereby and thus insure against separation.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred forms of the invention have been shown.

In said drawing:—

Figure 1 is an elevation of a flying ring having the present improvements combined therewith.

Fig. 2 is an enlarged section on line 2—2, Fig. 1.

Fig. 3 is a section on line 3—3, Fig. 2, the flexible support and the ring core being in elevation.

Fig. 4 is a view similar to Fig. 3 showing the improvements combined with a trapeze.

Referring to the figures by characters of reference 1 designates the core of a flying ring, the same being formed of any suitable material such as metal and the ends of the core forming the ring being provided with rounded annular ribs 2 adapted to abut as shown in Fig. 3. A sleeve 4 that is split longitudinally is folded about the meeting end portions of the core and has an interior groove 5 in which the ribs 2 are seated snugly. Extending from opposed portions of this sleeve are substantially semi-cylindrical extensions 6 formed with longitudinal recesses 7. These recesses are adapted to receive opposed portions of a flexible support 8 and a rivet 9 may be extended transversely through the extensions 6 and through the support 8 so as to bind the extensions on the support and hold the support against withdrawal from the recesses 7. By thus fastening the extensions the split sleeve is also held securely to the core 1 and cannot expand and release the ribs 2 seated therein.

Mounted on the core 1 is a tight fitting sleeve 10 preferably made of soft rubber and the ends of which abut against the ends of the split sleeve 4. Thus it will be seen that a cushioned ring or a ring having a resilient surface is provided and the same will not harden the hands. Furthermore they afford a grip that can be grasped tightly with less danger of the hand slipping therefrom than where a hard smooth surface is presented to the hand.

The same improvements can be embodied in a trapeze construction. In Fig. 4 the core of the trapeze bar has been indicated at 11 and is formed of suitable metal. In the structure illustrated this core has an annular groove 12 near one end in which are seated balls 13. A split sleeve 14 corresponding with the sleeve 4 is folded about the core and has an interior groove 15 into which the balls project. In all other respects this connection is the same as the one already described. A collar 16 may be fastened to the projecting end of the core 11 by means of a screw 17 or the like so as to constitute an abutment for the sleeve 14. It is to be understood that one of the sleeves 14 is to be provided at each end of the core 11 and that that portion of the core between the two sleeves 14 is to be housed within a sleeve 18 of soft rubber having the same advantages as the sleeve 10 on the flying ring.

What is claimed is:—

1. In a gymnasium ring, the combination with a rigid core, of a one piece split sleeve folded about the core, cooperating means on the core and sleeve for holding them against relative longitudinal movement, opposed recessed extensions integral with the sleeve, a flexible supporting element extending therebetween, and means extending through the extensions for binding them upon the supporting structure and holding the sleeve against expansion on the core.

2. In a gymnasium ring the combination with a rigid core, of a one piece split sleeve folded about the core and having an interior annular groove, means extending into the groove for holding the sleeve against movement longitudinally of the core, oppositely disposed recessed extensions integral with the sleeve, a support extending into the recesses and between the extensions, and means extending transversely through the support and extensions for binding them together and for holding the sleeve against expansion relative to the core.

3. In a gymnasium ring, the combination with a rigid core, of a one piece split sleeve embracing the core, cooperating means upon the core and sleeve for holding them against relative longitudinal movement, opposed extensions integral with the sleeve, a support projecting therebetween, and means extending transversely through the support and extensions for binding them together and for holding the sleeve clamped upon the core.

In testimony that I claim the foregoing as my own, I have hereto affixed my signature.

JAMES L. ENSOR.